United States Patent
Agarwal et al.

(10) Patent No.: US 10,601,939 B2
(45) Date of Patent: Mar. 24, 2020

(54) DESKTOP ERROR REPAIR TOOL

(71) Applicant: BANK OF AMERICA CORPORATION, Charlotte, NC (US)

(72) Inventors: Ankit Agarwal, Gurgaon (IN); Amol Patil, Dwarka (IN); Shailender Dabodiya, Gurgaon (IN); Sandeep Kumar Chauhan, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 85 days.

(21) Appl. No.: 15/695,764

(22) Filed: Sep. 5, 2017

(65) Prior Publication Data

US 2019/0075175 A1    Mar. 7, 2019

(51) Int. Cl.
| | |
|---|---|
| *G06F 9/445* | (2018.01) |
| *H04L 29/08* | (2006.01) |
| *G06F 8/65* | (2018.01) |
| *G06F 8/61* | (2018.01) |
| *G06F 11/07* | (2006.01) |

(52) U.S. Cl.
CPC .............. *H04L 67/26* (2013.01); *G06F 8/61* (2013.01); *G06F 8/65* (2013.01); *G06F 11/0793* (2013.01); *H04L 67/34* (2013.01)

(58) Field of Classification Search
CPC .. G06F 17/2288; G06F 17/24; G06F 17/2247; G06F 17/212; G06F 8/65; G06F 8/61; G06F 11/0793; H04L 67/26; H04L 67/34
USPC .......................................................... 715/229
See application file for complete search history.

(56) References Cited

U.S. PATENT DOCUMENTS

| | | | |
|---|---|---|---|
| 6,671,812 B1 | 12/2003 | Balasubramaniam | |
| 6,701,441 B1 | 3/2004 | Balasubramaniam | |
| 6,895,513 B1 | 5/2005 | Balasubramaniam | |
| 6,990,660 B2 | 1/2006 | Moshir | |
| 7,472,419 B1 | 12/2008 | Balasubramaniam | |
| 7,480,941 B1 | 1/2009 | Balasubramaniam | |
| 7,823,147 B2* | 10/2010 | Moshir | G06F 8/62 709/221 |
| 8,296,605 B2* | 10/2012 | John | G06F 11/0748 714/25 |
| 8,327,190 B2* | 12/2012 | Shinboku | G06F 11/0775 714/26 |
| 8,706,576 B1 | 4/2014 | Balasubramaniam | |

(Continued)

*Primary Examiner* — Scott T Baderman
*Assistant Examiner* — Hassan Mrabi
(74) *Attorney, Agent, or Firm* — Michael A. Springs

(57) ABSTRACT

An apparatus includes a scanner and a resolution engine. The scanner detects first and second software exceptions. The scanner also determines that the first software exception occurred previously in a plurality of desktops and that the second software exception did not occur previously in the plurality of desktops. The resolution engine determines a first solution and a second solution for resolving the first software exception and that the first solution has a higher ranking than the second solution. The resolution engine also generates a software patch that implements the first solution and deploys the software patch. The resolution engine further determines a series of steps implemented to resolve the second software exception and records the series of steps to prepare a second software patch if the second software exception occurs again in the plurality of desktops.

21 Claims, 3 Drawing Sheets

(56) References Cited

U.S. PATENT DOCUMENTS

| | | | |
|---|---|---|---|
| 2002/0112200 A1* | 8/2002 | Hines | G06F 8/66 714/38.11 |
| 2003/0033313 A1* | 2/2003 | Zweifel | G06F 8/61 |
| 2004/0255298 A1* | 12/2004 | Dorrance | G06F 16/2365 718/101 |
| 2005/0038832 A1* | 2/2005 | Feigenbaum | G06F 11/0748 |
| 2009/0013208 A1* | 1/2009 | DiMuzio | G06F 9/4812 714/2 |
| 2009/0106578 A1* | 4/2009 | Dilman | G06F 11/0727 714/2 |
| 2010/0146325 A1* | 6/2010 | John | G06F 11/0793 714/3 |
| 2015/0033202 A1* | 1/2015 | Wilson | G06F 8/43 717/106 |
| 2016/0299807 A1* | 10/2016 | Tanabe | G06F 11/32 |
| 2017/0004065 A1* | 1/2017 | Angwin | G06F 11/3668 |
| 2017/0091019 A1* | 3/2017 | Li | G06F 11/0709 |
| 2018/0011700 A1* | 1/2018 | Plate | G06F 8/65 |
| 2018/0165182 A1* | 6/2018 | Yoshida | G06F 11/3688 |

\* cited by examiner

DESKTOP ERROR REPAIR TOOL

TECHNICAL FIELD

This disclosure relates generally to repairing software errors in computers.

BACKGROUND

Computers are used ubiquitously throughout organizations by members and employees. The computers may execute applications that perform various functions.

SUMMARY OF THE DISCLOSURE

According to an embodiment, an apparatus includes a scanner and a resolution engine. The scanner detects, in a desktop of a plurality of desktops, a first software exception occurring in an application of a plurality of executing applications and detects, in a desktop of the plurality of desktops, a second software exception occurring in an application of the plurality of executing applications. The scanner also determines that the first software exception occurred previously in the plurality of desktops and determines that the second software exception did not occur previously in the plurality of desktops. The resolution engine determines a first solution and a second solution for resolving the first software exception and determines that the first solution has a higher ranking than the second solution. The resolution engine also generates a software patch that implements the first solution in response to the determination that the first solution has a higher ranking than the second solution and deploys the software patch. The resolution engine further determines a series of steps implemented to resolve the second software exception and records the series of steps to prepare a second software patch if the second software exception occurs again in the plurality of desktops.

According to another embodiment, a method includes detecting, in a desktop of a plurality of desktops, a first software exception occurring in an application of a plurality of executing applications and detecting, in a desktop of the plurality of desktops, a second software exception occurring in an application of the plurality of executing applications. The method also includes determining that the first software exception occurred previously in the plurality of desktops and determining that the second software exception did not occur previously in the plurality of desktops. The method further includes determining a first solution and a second solution for resolving the first software exception and determining that the first solution has a higher ranking than the second solution. The method also includes generating a software patch that implements the first solution in response to the determination that the first solution has a higher ranking than the second solution and deploying the software patch. The method further includes determining a series of steps implemented to resolve the second software exception and recording the series of steps to prepare a second software patch if the second software exception occurs again in the plurality of desktops.

According to yet another embodiment, a system includes a plurality of desktops and a desktop repair tool. The desktop repair tool detects, in a desktop of the plurality of desktops, a first software exception occurring in an application of a plurality of executing applications and detects, in a desktop of the plurality of desktops, a second software exception occurring in an application of the plurality of executing applications. The desktop repair tool also determines that the first software exception occurred previously in the plurality of desktops and determines that the second software exception did not occur previously in the plurality of desktops. The desktop repair tool further determines a first solution and a second solution for resolving the first software exception and determines that the first solution has a higher ranking than the second solution. The desktop repair tool also generates a software patch that implements the first solution in response to the determination that the first solution has a higher ranking than the second solution and deploys the software patch. The desktop repair tool further determines a series of steps implemented to resolve the second software exception and records the series of steps to prepare a second software patch if the second software exception occurs again in the plurality of desktops.

Certain embodiments provide one or more technical advantages. For example, an embodiment repairs software exceptions occurring in desktops. As another example, an embodiment generates software patches to repair desktops. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
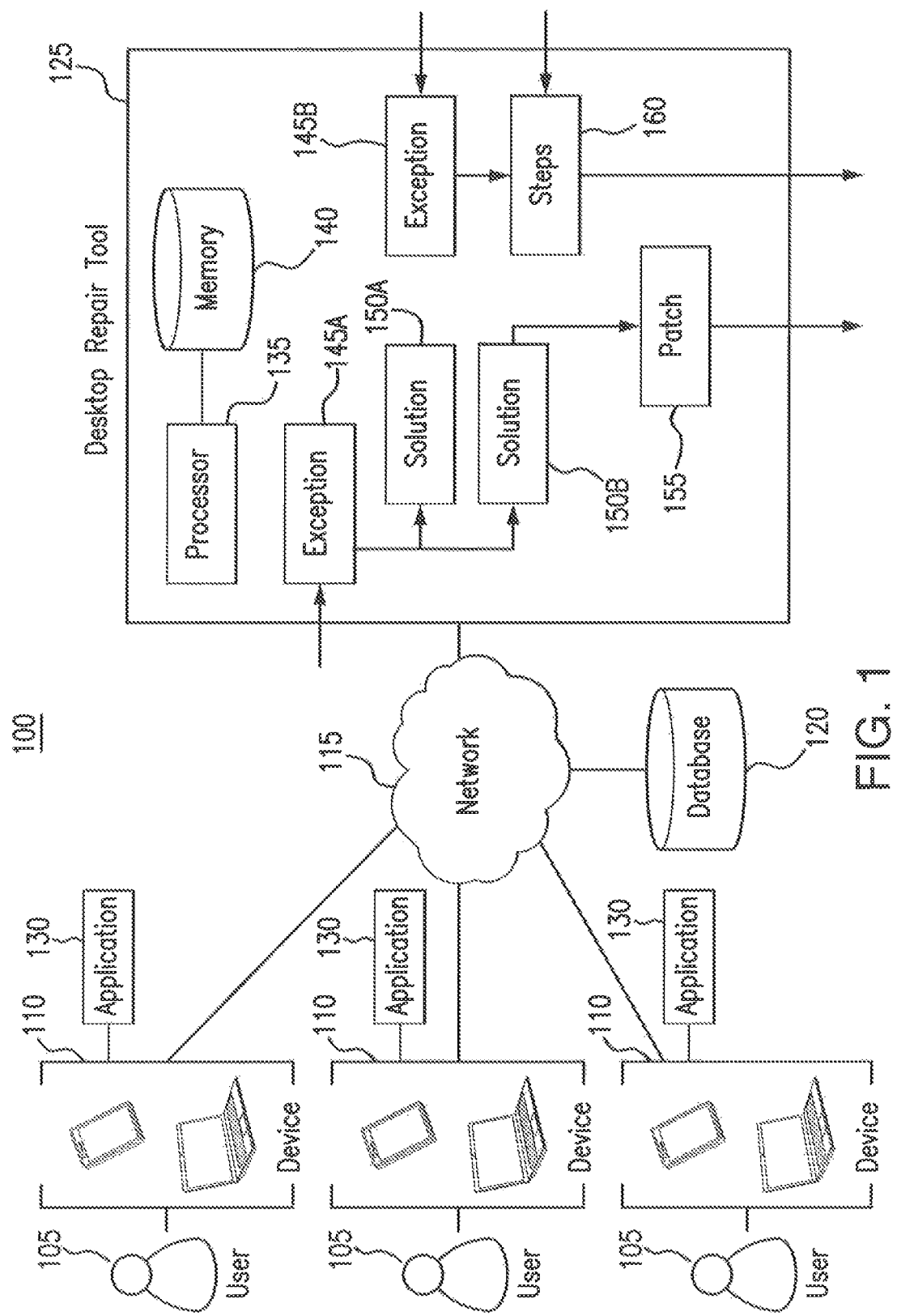
FIG. 1 illustrates a computer system.
Figure 2:
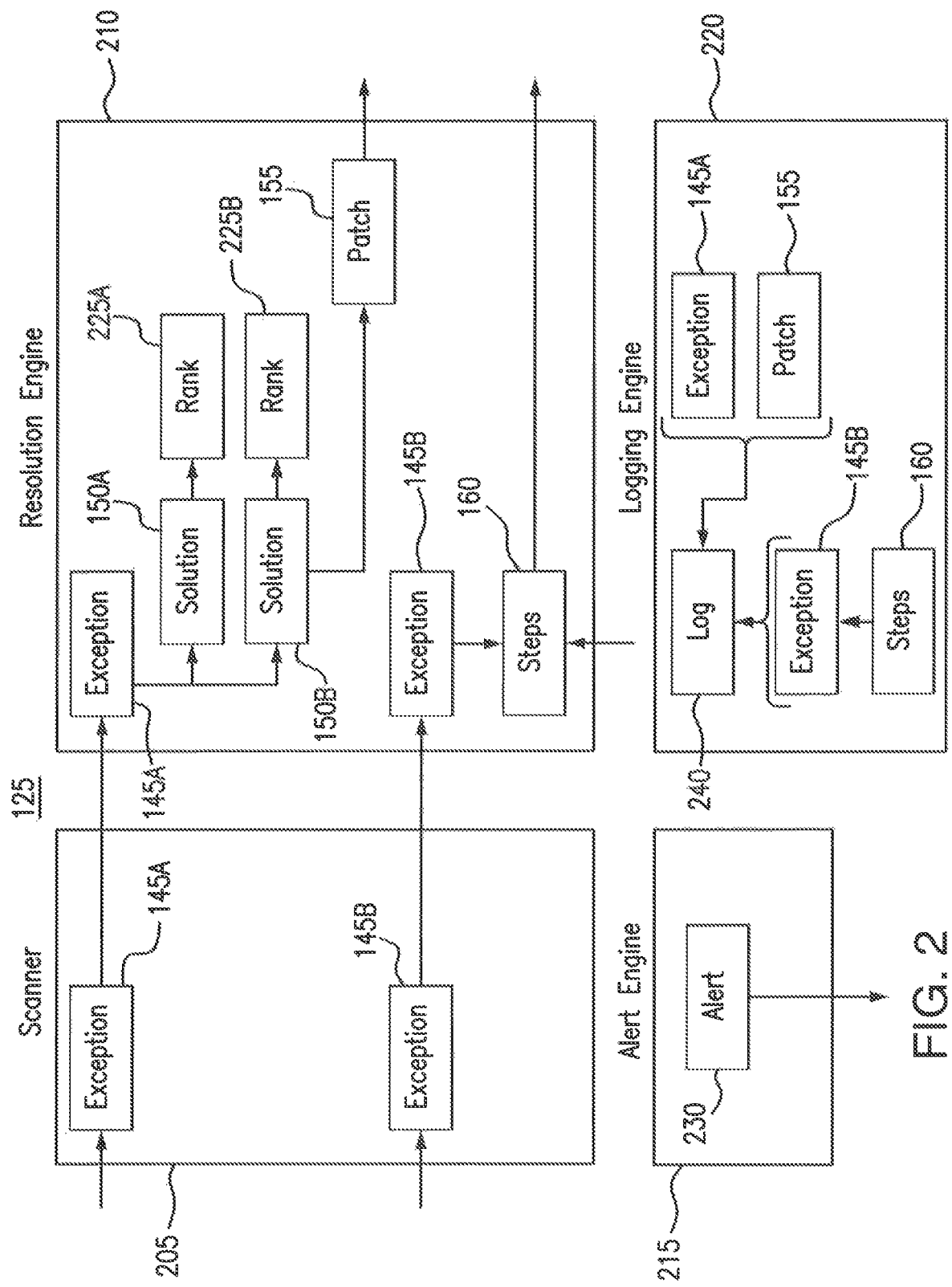
FIG. 2 illustrates a desktop repair tool of the system of FIG. 1.
Figure 3:
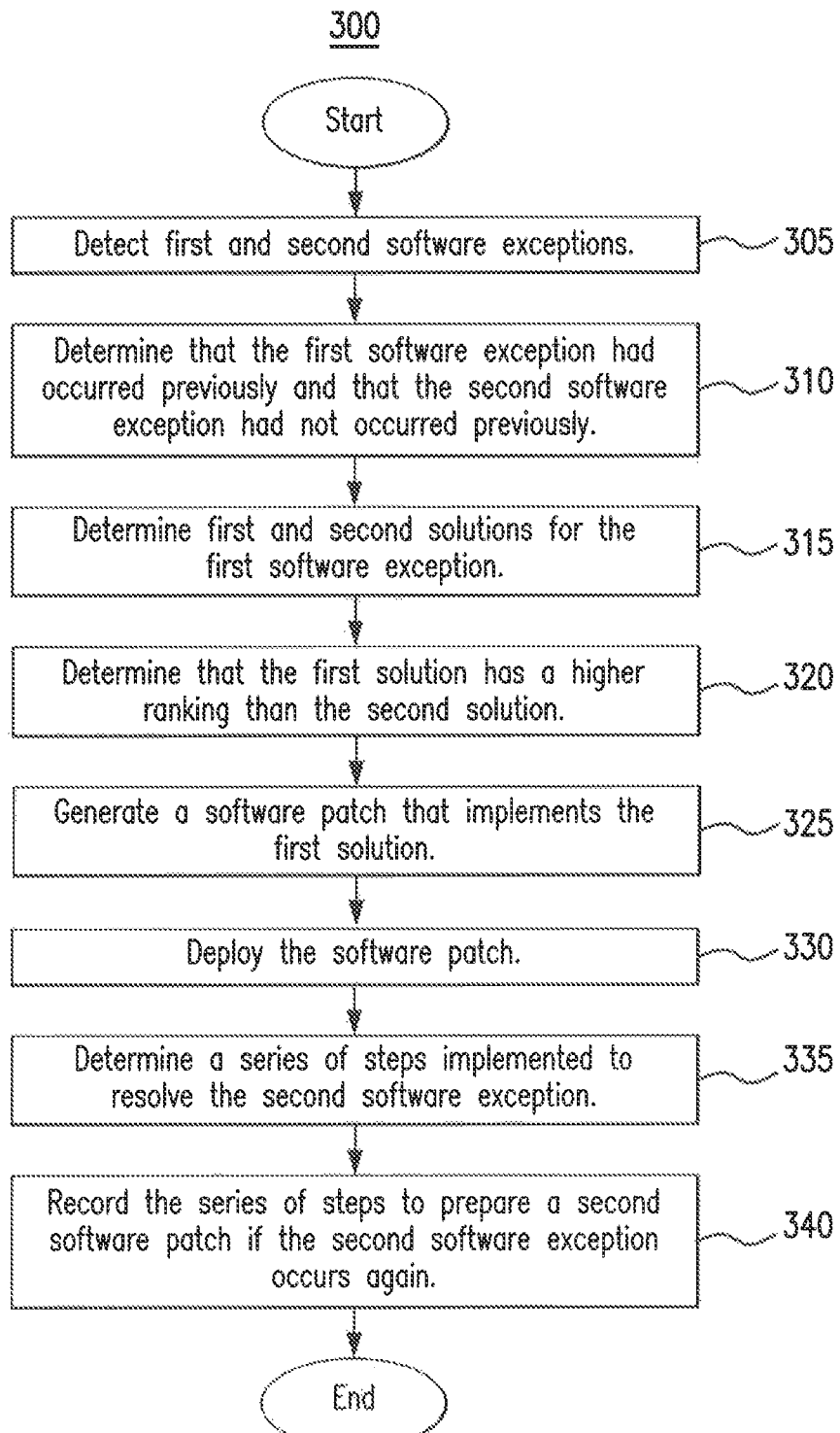
FIG. 3 is a flowchart illustrating a method for repairing desktops using the system of FIG. 1.

Embodiments of the present disclosure and its advantages are best understood by referring to FIGS. 1 through 3 of the drawings, like numerals being used for like and corresponding parts of the various drawings.

Computers are used ubiquitously throughout organizations by members and employees. The computers may execute applications that perform various functions required by the operating member or employee. Some computers may execute the same applications if the members or employees perform the same function. Some computers may execute different applications if the members or employees perform different functions within the organization. As an organization grows, so does the number of computers and applications within that organization.

In certain instances, applications may contain bugs that cause errors and/or failures. However, these bugs may only be triggered by specific workflows such that the occurrences of errors and/or failures caused by the bugs may be sporadic or unpredictable. Additionally, an organization may be dispersed across different geographies and/or locations. When a bug causes an error or failure, the application and/or computer may be repaired by someone who is local to that computer or application. If that error or failure occurs in different locations of the organization, then different people may be tasked with repairing the error or failure. These repairmen may not have the same knowledge base and may not attempt to repair the error or failure in the same manner. Some may be able to repair the error or failure and some may not. Additionally, some may repair the error or failure without actually addressing the underlying bug. As a result, computers across the organization may remain unrepaired and software bugs may remain untreated.

This disclosure contemplates an unconventional desktop repair tool that detects software exceptions and determines resolutions for the exceptions. The desktop repair tool learns the proper steps for repairing software exceptions and implements those steps and/or resolutions across an organization. In certain embodiments, the desktop repair tool improves the process for repairing a desktop and/or software application by implementing solutions and/or patches for those desktops and/or applications. By using the desktop repair tool, desktops across an organization may have their software bugs, errors, and/or failures repaired in a timely and consistent manner. The desktop repair tool will be described generally using FIG. 1. FIGS. 2 and 3 will describe the desktop repair tool in more detail.

FIG. 1 illustrates a computer system 100. As illustrated in FIG. 1, system 100 includes one or more devices 110, a network 115, a database 120, and a desktop repair tool 125. In particular embodiments, system 100 improves the functioning of devices 110 by repairing bugs, errors, and/or failures that occur in devices 110.

Devices 110 may be used by users 105 to perform various functions. Each device 110 may execute an application 130 or multiple applications 130 to perform these tasks. Devices 110 may execute different applications 130 depending on the desires and expectations of a user 105 of a particular device 110. As the number of user 105 and devices 110 grows, so does the number of applications 130 being executed in system 100.

In some instances, a particular application 130 may not have been developed perfectly. In other words, the application 130 may include bugs that cause errors and/or failures. In some instances, these bugs may only be triggered when a user 105 performs a certain workflow in application 130. In other words, even though two users 105 are using the same application 130, it may not be the case that both users 105 will encounter the same bug in all instances. It may even be the case that both users 105 may not encounter the bug at all.

When a bug is triggered and an error or failure results, it may be necessary to repair the application 130 and/or device 110. A local repair person may attempt to correct the error and/or failure and to repair the bug. However, that repair person may not have a sufficient knowledge base to repair the bug. In these instances, the bug may go unrepaired and the device 110 and/or application 130 may fail in the future because of the same bug.

Devices 110 may be any appropriate device for communicating with components of system 100 over network 115. For example, devices 110 may be a telephone, a mobile phone, a computer, a laptop, a tablet and/or an automated assistant. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 120 stores information used by other components of system 100. For example, database 120 may store various resolutions for bugs that occur in application 130. Database 120 may retrieve and send any stored information to other components of system 100. For example, database 120 may retrieve and send resolutions and other information about bugs, errors, and/or failures to other components.

Desktop repair tool 125 provides resolutions for bugs, errors, and/or failures in devices 110. As illustrated in FIG. 1, desktop repair tool 125 includes a processor 135 and a memory 140. This disclosure contemplates processor 135 and memory 140 being configured to perform any of the functions of desktop repair tool 125 described herein. In particular embodiments, desktop repair tool 125 improves the functioning of devices 110 by resolving bugs, errors and/or failures in devices 110.

Processor 135 is any electronic circuitry, including, but not limited to microprocessors, application specific integrated circuits (ASIC), application specific instruction set processor (ASIP), and/or state machines, that communicatively couples to memory 140 and controls the operation of desktop repair tool 125. Processor 135 may be 8-bit, 16-bit, 32-bit, 64-bit or of any other suitable architecture. Processor 135 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 135 may include other hardware and software that operates to control and process information. Processor 135 executes software stored on memory to perform any of the functions described herein. Processor 135 controls the operation and administration of desktop repair tool 125 by processing information received from network 115, device(s) 110, and memory 140. Processor 135 may be a programmable logic device, a microcontroller, a microprocessor, any suitable processing device, or any suitable combination of the preceding. Processor 135 is not limited to a single processing device and may encompass multiple processing devices.

Memory 140 may store, either permanently or temporarily, data, operational software, or other information for processor 135. Memory 140 may include any one or a combination of volatile or non-volatile local or remote devices suitable for storing information. For example, memory 140 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 140, a disk, a CD, or a flash drive. In particular embodiments, the software may include an application executable by processor 135 to perform one or more of the functions described herein.

Desktop repair tool 125 detects exceptions 145A and 145B in devices 110 and/or applications 130. When a bug causes an error and/or failure in application 130, the application 130 may throw an exception 145. The exception may indicate the type of failure and/or the symptoms of the failure. The exception 145 may not indicate the underlying cause of the failure. The exception 145 may also not indicate the bug that caused the error and/or failure.

An exception 145 may occur in a particular application 130 executing on a particular device 110 of system 100. Different devices 110 and/or different applications 130 may throw different exceptions 145. For example, exception 145A may have been thrown by a first application 130 in a first device 110 of system 100. Exception 145B may have been thrown by a different application 130 executing in a different device 110 of system 100. Exception 145A and exception 145B may indicate different failures that occurred in different applications 130. In some instances, exception 145A and exception 145B may have been thrown by the same application 130 executing on different devices 110 or by different applications 130 executing on the same device 110.

Desktop repair tool 125 may monitor devices 110 and/or applications 130 in system 100 to detect when exceptions 145 have been thrown by an application 130. When desktop repair tool 125 detects that an exception 145 has been thrown, desktop repair tool 125 may endeavor to resolve the exception 145.

Desktop repair tool 125 may first determine whether an exception 145 has occurred previously in system 100 such as, for example, in another device 110 of system 100. Desktop repair tool 125 may search database 120 for a detected exception 145. For example, desktop repair tool 125 may search database 120 using keywords indicated by exception 145. A search of database 120 may reveal whether the particular exception 145 has occurred previously and the various resolutions for that exception 145.

For example, desktop repair tool 125 may receive a first exception 145A. Desktop repair tool 125 may then search database 120 and determine that exception 145A has occurred previously in system 100. Desktop repair tool 125 may also retrieve solutions 150 for exception 145A from database 120. In the illustrated example of FIG. 1, desktop repair tool 125 retrieves first solution 150A and second solution 150B from database 120. Each solution 150 may have been implemented previously to repair exception 145A. Desktop repair tool 125 may evaluate both solutions 150 to determine which solution 150 to implement to repair exception 145A in this instance. For example, database 120 may indicate the success rate of each solution 150 and provide a ranking of the solutions 150. Desktop repair tool 125 may select the solution 150 with the higher and/or highest ranking to implement. In the illustrated example of FIG. 1, desktop repair tool 125 may determine that solution 150B has a higher ranking than solution 150A. In response, desktop repair tool 125 may implement solution 150B to repair exception 145A.

To implement solution 150B, desktop repair tool 125 may generate a software patch 155 that implements solution 150B. Desktop repair tool 125 may then deploy patch 155 to a device 110 that threw exception 145A. That device 110 may then install patch 155 to repair a bug, error, or failure that threw exception 145A. In this manner, desktop repair tool 125 provides a resolution for a bug, error, or failure that has occurred previously in system 100 in particular embodiments.

Desktop repair tool 125 may detect a second exception 145B and determine by searching database 120 that exception 145B has not occurred previously in system 100. As a result, database 120 may not indicate any resolution for exception 145B. Desktop repair tool 125 may then monitor the device 110 that threw exception 145B as it is being repaired by a local repair person. Desktop repair tool 125 may detect the steps 160 that are performed to resolve exception 145B. If exception 145B is successfully repaired, desktop repair tool 125 may collect steps 160 and then store them to database 120 for later use. If exception 145B occurs again in system 100, desktop repair tool 125 may retrieve steps 160 to prepare a second patch to repair the bug, error, or failure that threw exception 145B.

In particular embodiments, desktop repair tool 125 improves the functioning of devices 110 by repairing bugs, errors, and/or failures that occur in devices 110. In some embodiments, desktop repair tool corrects bugs, errors, and/or failures that are not fixable by a local repair person.

FIG. 2 illustrates a desktop repair tool 125 of the system 100 of FIG. 1. As illustrated in FIG. 2, desktop repair tool 125 includes a scanner 205, a resolution engine 210, an alert engine 215, and a logging engine 220. In particular embodiments, desktop repair tool 125 improves the functioning of devices in system 100 by resolving and/or implementing solutions for bugs, errors, and/or failures that occur in the devices.

Scanner 205 monitors various devices in system 100 to detect when those devices throw exceptions 145. In the illustrated example of FIG. 2, scanner 205 detects that one or more devices in the system 100 have thrown exceptions 145A and 145B. Exception 145A may be different from exception 145B and may be caused by different bugs in different and/or the same devices.

Scanner 205 may determine whether each exception 145 that it detects has occurred previously in the system. If the exception 145 has occurred previously in the system, then it is likely that the database has stored a resolution for the exception 145. Desktop repair tool 125 may use the stored resolution to repair this instance of the exception 145. For example, scanner 205 may query a database using keywords from each exception 145 to determine whether the database has information on the exception 145. If the database has information about the exception 145, then scanner 205 may determine that the exception 145 has occurred previously in the system. For example, scanner 205 may determine that exception 145A has occurred previously in the system, perhaps on another device. Scanner 205 may also determine that exception 145B has not occurred previously in the system because the database does not include any entry or any resolution for exception 145B. Scanner 205 may then forward each exception 145 to resolution engine 210 with an indication of whether the exception 145 has occurred previously in the system.

Resolution engine 210 determines and prepares resolutions for an exception 145. For exception 145A which has occurred previously in the system, resolution engine 210 may determine a resolution using previous solutions 150. Resolution engine 210 may receive and/or retrieve solutions 150A and 150B for exception 145A. Each solution 150 may have been used previously to successfully repair exception 145A. For example, each solution 150 may repair a bug, error, and/or failure that threw exception 145A. Resolution engine 210 may select one of the solutions 150 to implement.

Resolution engine 210 may select a solution 150 that has a higher rank 225. In certain embodiments, a solution 150 may have a higher rank 225 if it has a higher success rate of repairing a bug, error, or failure that threw exception 145A than another solution 150. In the illustrated example of FIG. 2, resolution engine 210 retrieves solutions 150A and 150B for exception 145A. Solution 150A has a rank 225A and solution 150B has a rank 225B. Resolution engine 210 may compare rank 225A and rank 225B to determine that solution 150B has a higher rank than solution 150A. In certain embodiments, solution 150B may have a higher rank than solution 150A because solution 150B has a higher success rate of resolving the bug, error, or failure that threw exception 145A than solution 150A. In response, resolution engine 210 selects solution 150B. This disclosure contemplates desktop repair tool 125 retrieving any number of solutions 150 for an exception 145 and determining the solution 150 with the highest rank.

Resolution engine 210 generates a software patch 155 that implements solution 150B. Resolution engine 210 may then deploy patch 155 to the device that threw exception 145A. The device may install patch 155 to repair the bug, error, or failure that threw exception 145A. In this manner, resolution engine 210 repairs the bug, error, or failure automatically without needing intervention by a local repair person.

For exception 145B, resolution engine 210 may determine that because exception 145B has not occurred previously in the system, that exception 145B does not have a resolution stored in a database. As a result, resolution engine 210 must learn how to resolve exception 145B. Resolution engine 210 may monitor the device that threw exception 145B to determine the steps that a local repair person followed to address and/or resolve exception 145B. If the local repair person successfully repairs the bug, error, or failure that threw exception 145B, resolution engine 210 may receive and record steps 160 that were followed by the repair person to repair the bug, error, or failure. Resolution engine 210 may then store steps 160 in the database and associate it with exception 145B. Resolution engine 210 may then use steps 160 to prepare a second software patch in the future that repairs the bug, error, or failure that threw exception 145B should exception 145B be thrown again in the system. In this manner, resolution engine 210 repairs bugs, errors, or failures that repeatedly occur in the system.

In particular embodiments, resolution engine 210 also identifies and records a line of code that caused exception 145B. For example, resolution engine 210 may record an application in which exception 145B was thrown. Resolution engine 210 may also record a line of code in the application that was the source of the bug, error or failure that threw exception 145B. By recording the line of code, resolution engine 210 may be able to subsequently prepare a patch to repair the bug, error or failure.

In some embodiments, desktop repair tool 125 may determine that there is no solution for a certain exception. For example, scanner 205 may detect a third exception and resolution engine 210 may determine that there is no solution for the third exception. In response, resolution engine 210 may record the third exception as an unsolvable exception.

In particular embodiments, resolution engine 210 may determine that patch 155 did not successfully repair the bug, error or failure that threw exception 145A. In response, resolution engine 210 may roll back the deployment of patch 155 from the device. Resolution engine 210 may then generate another patch that implements solution 150A and deploys that patch to the device to repair the bug, error or failure that threw exception 145A.

In certain embodiments, desktop repair tool 125 includes an alert engine 215. Alert engine 215 generates and communicates alerts 230. Alert 230 may indicate an exception 145 and the particular resolution for that exception 145. For example, alert 230 may indicate that exception 145A was resolved by selecting solution 150B and deploying patch 155. Alert engine 215 may communicate alert 230 to an administrator to let the administrator know that an exception 145 has been resolved and the manner in which it was resolved.

In particular embodiments, desktop repair tool 125 includes a logging engine 220. Logging engine 220 may generate and maintain a log 240 that indicates the various exceptions 145 and the resolutions for each exception 145. For example, logging engine 220 may add an indication into log 240 that exception 145A was resolved by deploying patch 155. Logging engine 220 may also add an entry into log 240 that indicates that exception 145B was resolved by following steps 160.

FIG. 3 is a flowchart illustrating a method 300 for repairing desktops using the system 100 of FIG. 1. In particular embodiments, desktop repair tool 125 performs method 300. By performing method 300, desktop repair tool 125 improves the functioning of devices in the system by repairing bugs, errors, and/or failures in those devices.

Desktop repair tool 125 begins by detecting first and second software exceptions in step 305. In step 310, desktop repair tool 125 determines that the first software exception had occurred previously and that the second software exception had not occurred previously in the system. Desktop repair tool 125 then determines first and second solutions for the first software exception in step 315. In step 320, desktop repair tool 125 determines that the first solution has the higher ranking than the second solution. In step 325, desktop repair tool 125 generates a software patch that implements the first solution. Desktop repair tool 125 then deploys the software patch in step 330. In step 335, desktop repair tool 125 determines a series of steps implemented to resolve the second software exception. Desktop repair tool 125 then records the series of steps to prepare a second software patch if the second software exception occurs again in step 340.

Modifications, additions, or omissions may be made to method 300 depicted in FIG. 3. Method 300 may include more, fewer, or other steps. For example, steps may be performed in parallel or in any suitable order. While discussed as desktop repair tool 125 (or components thereof) performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory; and
a hardware processor communicatively coupled to the memory, the hardware processor configured to:

detect, in a desktop of a plurality of desktops, a first
   software exception occurring in a first application of
   a plurality of executing applications;
detect, in a desktop of the plurality of desktops, a
   second software exception occurring in a second
   application of the plurality of executing applications,
   the second application different from the first application;
determine that the first software exception occurred
   previously in the plurality of desktops by querying a
   database using keywords from the first software
   exception;
determine that the second software exception did not
   occur previously in the plurality of desktops by
   querying the database using keywords from the
   second software exception;
determine a first solution and a second solution for
   resolving the first software exception;
determine that the first solution has a higher ranking
   than the second solution;
generate a first software patch that implements the first
   solution in response to the determination that the first
   solution has a higher ranking than the second solution;
deploy the first software patch;
identify and record a line of code in the second application that was the source of the second software
   exception;
determine a series of steps implemented to resolve the
   second software exception;
record the series of steps;
determine that the software patch did not fix the first
   software exception;
in response to determining that the software patch did
   not fix the first software exception:
   roll back the deployment of the first software patch;
   determine that the second solution has the next
      highest ranking after the first solution;
   in response to the determination that the second
      solution has the next highest ranking after the first
      solution, generate a second software patch that
      implements the second solution; and
   deploy the second software patch
detect, in a desktop of the plurality of desktops, a third
   software exception occurring in a third application of
   the plurality of executing applications, the third
   application different from the second application;
determine that the third software exception is the same
   as the second software exception;
in response to determining that the third software
   exception is the same as the second software exception, prepare a third software patch using the
   recorded series of steps and the recorded line of
   code;
deploy the third software patch;
determine a fourth software exception occurring in a
   fourth application of the plurality of executing applications;
determine that there is no solution for the fourth
   software exception; and
in response to determining that there is no solution to
   the fourth software exception, record the fourth
   software exception as unsolvable;
add, to a log, an indication that the first software
   exception was resolved using the software patch; and
add, to the log, the series of steps that resolved the
   second software exception.

2. The apparatus of claim 1, wherein the hardware processor is further configured to communicate an alert indicating that the first software exception can be resolved through the first software patch.

3. The apparatus of claim 1, wherein the hardware processor is further configured to monitor the plurality of desktops to detect when exceptions have been thrown.

4. The apparatus of claim 1, wherein the first solution has a higher ranking than the second solution because the first solution has a higher success rate of resolving the first software exception than the second solution.

5. The apparatus of claim 1, wherein the hardware processor is further configured to monitor the desktop in which the second exception occurred to determine the series of steps.

6. The apparatus of claim 1, wherein determining the series of steps implemented to resolve the second software exception is performed in response to determining that the second software exception did not occur previously in the plurality of desktops.

7. The apparatus of claim 1, wherein deploying the third software patch fixes the third software exception.

8. A method comprising:
detecting, in a desktop of a plurality of desktops, a first
   software exception occurring in a first application of a
   plurality of executing applications;
detecting, in a desktop of the plurality of desktops, a
   second software exception occurring in a second application of the plurality of executing applications, the
   second application different from the first application;
determining that the first software exception occurred
   previously in the plurality of desktops by querying a
   database using keywords from the first software exception;
determining that the second software exception did not
   occur previously in the plurality of desktops by querying the database using keywords from the second
   software exception;
determining a first solution and a second solution for
   resolving the first software exception;
determining that the first solution has a higher ranking
   than the second solution;
generating a first software patch that implements the first
   solution in response to the determination that the first
   solution has a higher ranking than the second solution;
deploying the first software patch;
identifying and recording a line of code in the second
   application that was the source of the second software
   exception;
determining a series of steps implemented to resolve the
   second software exception; and
recording the series of steps;
determining that the software patch did not fix the first
   software exception;
in response to determining that the software patch did not
   fix the first software exception:
   rolling back the deployment of the first software patch;
   determining that the second solution has the next
      highest ranking after the first solution;
   in response to determining that the second solution has
      the next highest ranking after the first solution,
      generating a second software patch that implements
      the second solution; and
   deploying the second software patch
detecting, in a desktop of the plurality of desktops, a third
   software exception occurring in a third application of the plurality of executing applications the third application different from the second application;
determining that the third software exception is the same as the second software exception;
in response to determining that the third software exception is the same as the second software exception, preparing a third software patch using the recorded series of steps and the recorded line of code;
deploying the third software patch;
determining a fourth software exception occurring in a fourth application of the plurality of executing applications;
determining that there is no solution for the fourth software exception; and
in response to determining that there is no solution to the fourth software exception, recording the fourth software exception as unsolvable
adding, to a log, an indication that the first software exception was resolved using the software patch; and
adding, to the log, the series of steps that resolved the second software exception.

9. The method of claim 8, further comprising communicating an alert indicating that the first software exception can be resolved through the first software patch.

10. The method of claim 8, further comprising monitoring the plurality of desktops to detect when exceptions have been thrown.

11. The method of claim 8, wherein the first solution has a higher ranking than the second solution because the first solution has a higher success rate of resolving the first software exception than the second solution.

12. The method of claim 8, further comprising monitoring the desktop in which the second exception occurred to determine the series of steps.

13. The method of claim 8, wherein determining the series of steps implemented to resolve the second software exception is performed in response to determining that the second software exception did not occur previously in the plurality of desktops.

14. The method of claim 8, wherein deploying the third software patch fixes the third software exception.

15. A system comprising:
a plurality of desktops; and
a desktop repair tool comprising a memory and a hardware processor communicatively coupled to the memory, the hardware processor configured to:
detect, in a desktop of the plurality of desktops, a first software exception occurring in a first application of a plurality of executing applications;
detect, in a desktop of the plurality of desktops, a second software exception occurring in a second application of the plurality of executing applications, the second application different from the first application;
determine that the first software exception occurred previously in the plurality of desktops by querying a database using keywords from the first software exception;
determine that the second software exception did not occur previously in the plurality of desktops by querying the database using keywords from the second software exception;
determine a first solution and a second solution for resolving the first software exception;
determine that the first solution has a higher ranking than the second solution;
generate a first software patch that implements the first solution in response to the determination that the first solution has a higher ranking than the second solution;
deploy the first software patch;
identify and record a line of code in the second application that was the source of the second software exception;
determine a series of steps implemented to resolve the second software exception; and
record the series of steps;
determine that the software patch did not fix the first software exception;
in response to determining that the software patch did not fix the first software exception:
roll back the deployment of the first software patch;
determine that the second solution has the next highest ranking after the first solution;
in response to the determination that the second solution has the next highest ranking after the first solution, generate a second software patch that implements the second solution; and
deploy the second software patch
detect, in a desktop of the plurality of desktops, a third software exception occurring in a third application of the plurality of executing applications, the third application different from the second application;
determine that the third software exception is the same as the second software exception;
in response to determining that the third software exception is the same as the second software exception, prepare a third software patch using the recorded series of steps and the recorded line of code;
deploy the third software patch;
determine a fourth software exception occurring in a fourth application of the plurality of executing applications;
determine that there is no solution for the fourth software exception; and
in response to determining that there is no solution to the fourth software exception, record the fourth software exception as unsolvable
add, to a log, an indication that the first software exception was resolved using the software patch; and
add, to the log, the series of steps that resolved the second software exception.

16. The system of claim 15, wherein the desktop repair tool is further configured to communicate an alert indicating that the first software exception can be resolved through the first software patch.

17. The system of claim 15, wherein the desktop repair tool is further configured to monitor the plurality of desktops to detect when exceptions have been thrown.

18. The system of claim 15, wherein the first solution has a higher ranking than the second solution because the first solution has a higher success rate of resolving the first software exception than the second solution.

19. The system of claim 15, wherein the desktop repair tool is further configured to monitor the desktop in which the second exception occurred to determine the series of steps.

20. The system of claim 15, wherein determining the series of steps implemented to resolve the second software exception is performed in response to determining that the second software exception did not occur previously in the plurality of desktops.

21. The system of claim 15, wherein deploying the third software patch fixes the third software exception.

\* \* \* \* \*